US011657077B2

(12) United States Patent
Murakami et al.

(10) Patent No.: US 11,657,077 B2
(45) Date of Patent: May 23, 2023

(54) DOCUMENT CLASSIFICATION DEVICE, DOCUMENT CLASSIFICATION METHOD AND DOCUMENT CLASSIFICATION PROGRAM

(71) Applicant: Rakuten Group, Inc., Tokyo (JP)

(72) Inventors: Koji Murakami, Tokyo (JP); Masato Mita, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 1230 days.

(21) Appl. No.: 16/077,767

(22) PCT Filed: Dec. 21, 2016

(86) PCT No.: PCT/JP2016/088160
§ 371 (c)(1),
(2) Date: Aug. 14, 2018

(87) PCT Pub. No.: WO2017/149911
PCT Pub. Date: Sep. 8, 2017

(65) Prior Publication Data
US 2019/0050755 A1    Feb. 14, 2019

Related U.S. Application Data

(60) Provisional application No. 62/303,052, filed on Mar. 3, 2016.

(51) Int. Cl.
*G06F 16/35* (2019.01)
*G06F 16/28* (2019.01)
(Continued)

(52) U.S. Cl.
CPC ........ *G06F 16/353* (2019.01); *G06F 16/2246* (2019.01); *G06F 16/285* (2019.01);
(Continued)

(58) Field of Classification Search
CPC .. G06F 16/2246; G06F 16/285; G06F 16/353; G06F 16/93; G06F 18/24323;
(Continued)

(56) References Cited

U.S. PATENT DOCUMENTS 6,947,936 B1 * 9/2005 Suermondt ........... G06F 16/353
7,644,052 B1 * 1/2010 Chang ..................... G06N 5/022
706/45
(Continued)

FOREIGN PATENT DOCUMENTS

JP      2006-18829 A    1/2006

OTHER PUBLICATIONS

H. B. Borges and J. C. Nievola, "Hierarchical classification using a Competitive Neural Network," 2012 8th International Conference on Natural Computation, 2012, pp. 172-177, doi: 10.1109/ICNC.2012.6234573. (Year: 2012).*

(Continued)

*Primary Examiner* — Stephen S Hong
*Assistant Examiner* — Nicholas Hasty
(74) *Attorney, Agent, or Firm* — Sughrue Mion, PLLC

(57) ABSTRACT

A computer system document according to one embodiment includes a generation unit and an update unit. The generation unit performs first machine learning on a target document, as input data, to which a correct path in a tree structure where each node indicates a document category is given, and thereby generates a classification model indicating a right path to a leaf node for the target document. The update unit performs second machine learning that applies, to the classification model, the target document to which the correct path is not given, and when a path from an Nth level node to an (N+1)th level node is different from the correct path, updates the classification model by setting a modified path from the (N+1)th level node to an (N+2)th level node
(Continued)

different from a child node of the (N+1)th level node based on the correct path.

10 Claims, 8 Drawing Sheets

(51) Int. Cl.
   G06F 16/93    (2019.01)
   G06F 16/22    (2019.01)
   G06V 30/413   (2022.01)
   G06V 30/19    (2022.01)
   G06N 20/00    (2019.01)
   G06F 18/243   (2023.01)

(52) U.S. Cl.
   CPC ........ *G06F 16/93* (2019.01); *G06F 18/24323* (2023.01); *G06N 20/00* (2019.01); *G06V 30/19173* (2022.01); *G06V 30/413* (2022.01)

(58) Field of Classification Search
   CPC .... G06K 9/6282; G06N 20/00; G06V 30/413; G06V 30/19173
   USPC .......................................................... 706/12
   See application file for complete search history.

(56) References Cited

U.S. PATENT DOCUMENTS

| | | |
|---|---|---|
| 2006/0004747 A1 | 1/2006 | Weare |
| 2012/0166366 A1* | 6/2012 | Zhou .................. G06N 20/00 706/59 |
| 2014/0012849 A1* | 1/2014 | Ulanov ................ G06F 16/285 707/E17.046 |
| 2015/0324459 A1 | 11/2015 | Chhichhia et al. |
| 2016/0189058 A1* | 6/2016 | Ozkan .................. G06N 5/045 706/12 |

OTHER PUBLICATIONS

C. Zhu, J. Ma, D. Zhang, X. Han and X. Niu, "Hierarchical Document Classification Based on a Backtracking Algorithm," 2008 Fifth International Conference on Fuzzy Systems and Knowledge Discovery, 2008, pp. 467-471, doi: 10.1109/FSKD.2008.346. (Year: 2008).*

International Preliminary Report on Patentability with the translation of Written Opinion dated Sep. 13, 2018 issued by the International Bureau in counterpart International Application No. PCT/JP2016/088160.

* cited by examiner

DOCUMENT CLASSIFICATION DEVICE, DOCUMENT CLASSIFICATION METHOD AND DOCUMENT CLASSIFICATION PROGRAM

This application is a National Stage of International Application No. PCT/JP2016/088160 filed Dec. 21, 2016 claiming priority based on U.S. Provisional Application No. 62/303,052 filed Mar. 3, 2016.

TECHNICAL FIELD

One aspect of the present invention relates to a device, a method and a program for classifying documents by using a tree structure.

BACKGROUND ART

A technique to classify documents by using a tree structure is known. For example, the following Patent Document 1 discloses automatic classification generation that, in hierarchical classification of documents, forms categories of information as a binary tree which includes nodes in a binary tree containing information related to a search.

CITATION LIST

Patent Literature

PTD1: JP 2006-018829 A

SUMMARY OF INVENTION

Technical Problem

In the classification using a tree structure, once a document is classified into an incorrect node in a certain level by error, processing proceeds toward a lower layer without correcting the error. It is thus desired to enhance the accuracy of document classification using a tree structure.

Solution to Problem

A document classification device according to one aspect of the present invention includes a generation unit configured to perform first machine learning on a target document, as input data, to which a correct path in a tree structure is given, each node in the tree structure indicating a document category, and thereby generate a classification model indicating a right path to a leaf node for the target document, and an update unit configured to perform second machine learning that applies, to the classification model, the target document to which the correct path is not given, and when a path from an Nth level node to an (N+1)th level node is different from the correct path, update the classification model by setting a modified path from the (N+1)th level node to an (N+2)th level node different from a child node of the (N+1)th level node based on the correct path.

A document classification method according to one aspect of the present invention is a document classification method performed by a document classification device including a processor, the method including a generation step of performing first machine learning on a target document, as input data, to which a correct path in a tree structure is given, each node in the tree structure indicating a document category, and thereby generating a classification model indicating a right path to a leaf node for the target document, and an update step of performing second machine learning that applies, to the classification model, the target document to which the correct path is not given, and when a path from an Nth level node to an (N+1)th level node is different from the correct path, updating the classification model by setting a modified path from the (N+1)th level node to an (N+2)th level node different from a child node of the (N+1)th level node based on the correct path.

A document classification program according to one aspect of the present invention causes a computer to execute a generation step of performing first machine learning on a target document, as input data, to which a correct path in a tree structure is given, each node in the tree structure indicating a document category, and thereby generating a classification model indicating a right path to a leaf node for the target document, and an update step of performing second machine learning that applies, to the classification model, the target document to which the correct path is not given, and when a path from an Nth level node to an (N+1)th level node is different from the correct path, updating the classification model by setting a modified path from the (N+1)th level node to an (N+2)th level node different from a child node of the (N+1)th level node based on the correct path.

In the above-described aspects, a classification model is generated by machine learning using a target document to which a correct answer is given (so-called supervised learning). Then, when a path is different from the correct path in machine learning where a target document is applied to a classification model without giving a correct answer, a modified path to a different subtree is generated based on the correct path, rather than proceeding to a lower level node. With the modified path, it is possible to return in a direction of coming closer to a correct answer even when the classification processing has proceeded in a wrong direction. By using the classification model processed in this manner, it is possible to increase the accuracy of classifying a document using a tree structure.

Advantageous Effects of Invention

According to one aspect of the present invention, it is possible to enhance the accuracy of document classification using a tree structure.

DESCRIPTION OF EMBODIMENTS

Figure 1:
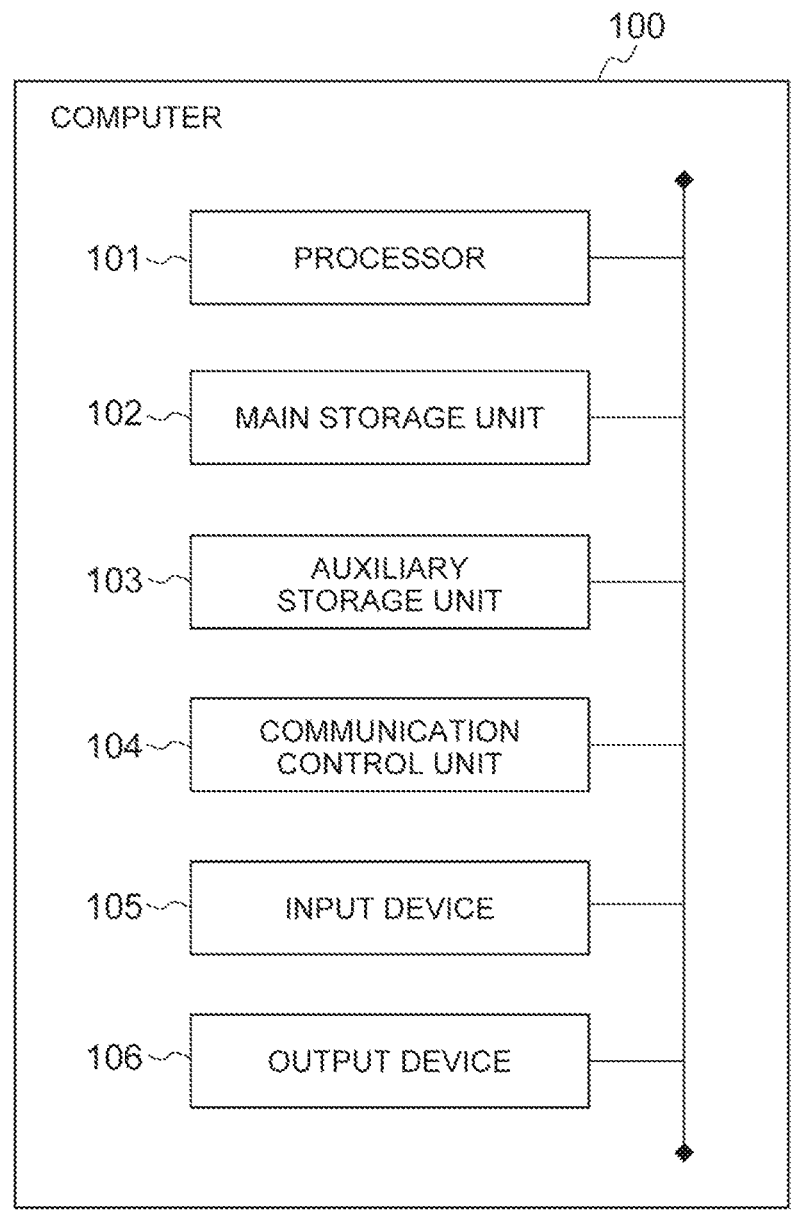
FIG. 1 is a view showing the hardware configuration of a computer that is used for a document classification device according to an embodiment.

An embodiment of the present invention is described hereinafter in detail with reference to the appended drawings. Note that, in the description of the drawings, the same or equivalent elements are denoted by the same reference symbols, and the redundant explanation thereof is omitted.

The functions and configuration of a document classification device 10 according to an embodiment are described hereinafter with reference to FIGS. 1 to 6. The document classification device 10 is a computer system that classifies a plurality of electronic documents by associating a document category with each electronic document. The electronic document is data that is recorded on any recording medium such as a database and memory and readable by a computer, and it contains text or character strings. In this specification, an electronic document is also referred to simply as "document". The document category is classification for sorting the properties of a document. In this specification, a document category is also referred to simply as "category". "Associating" means linking an object with another object, and this association allows another object to be derived from one object.

In this embodiment, a plurality of categories are structured in a tree structure. The tree structure is a data structure that represents a hierarchical relationship of a plurality of elements by a hierarchical structure where one element has a plurality of sub-elements, and one sub-element has a plurality of sub-sub elements. Each element in the tree structure is called a node, and two nodes are connected by a line called a link. In this specification, representation of the hierarchical structure of categories by such a tree structure is referred to as "category tree". Each node of the category tree indicates a category. The category tree is manually prepared and stored into a specified storage device (for example, a storage unit in the document classification device 10). The document classification device 10 processes a document sequentially from the top layer (root node) to the bottom layer (leaf node) in accordance with the category tree, and thereby determines the category of this document. Note that, in this specification, the root node is referred to as a first level, and a hierarchical level number increases one by one, like the second level, the third level and so on, toward the lower layer. A hierarchical level number in the category tree is represented by a natural number.

When there are an enormous number of categories, classification using the tree structure improves the efficiency in calculation and memory usage as whole. On the other hand, classification using the tree structure is carried out locally. Thus, once reaching an incorrect category (node), classification proceeds toward a node lower than the incorrect node, which results in classification of a document into a category with low relevance (error propagation).

The document classification device 10 performs processing using imitation learning in order to prevent the error propagation. Imitation learning is a method of learning a policy by mimicking an expert's ideal action so as to take the same action as the expert. The policy is mapping from the current state to the next action, which can be approximated by a classifier. Imitation learning itself is a known technique, and it includes Dataset Aggregation (DAGGER). The document classification device 10 generates a classification model by using imitation learning. The classification model is a policy that defines a path (route) for guiding a document to be processed (which is referred to as "target document" in this specification) from a starting point (e.g., root node) to a leaf node.

The document classification device 10 refers to a document database 20 to generate a classification model. The document database 20 is a device that stores a large number of documents. "Database" is a device (storage unit) that stores a set of data so as to respond to a given data operation (e.g., extraction, addition, deletion, overwriting etc.) from a processor or an external computer. The document database 20 may be implemented in any way, and it may be a database management system or a text file. The document classification device 10 can access the document database 20 through any communication network and read a document. Note that the document classification device 10 and the document database 20 are not necessarily separated, and the document classification device 10 may include the document database 20.

A method for collecting documents to be accumulated in the document database 20 is not limited. For example, the document database 20 may store, as documents, web pages collected by crawling the Internet, or store documents registered manually. The content of documents is also not limited, and documents may contain news (e.g., title or body text), comments in social networking services (SNSs), product pages (e.g., product title or product description) in online shopping sites or the like, for example.

A correct path in the category tree is given in advance to at least some of the documents stored in the document database 20. The correct path is an ideal (or right) path from the starting point (root node) of the category tree to the right leaf node (leaf category) to be associated with a document. The correct path is given manually.

In this embodiment, the document database 20 also stores documents for evaluating a generated classification model.

FIG. 1 shows a typical hardware configuration of a computer 100 that functions as the document classification device 10. The computer 100 includes a processor 101, a main storage unit 102, an auxiliary storage unit 103, a communication control unit 104, an input device 105, and an output device 106. The processor 101 is an electronic component that runs an operating system and an application program. The main storage unit 102 is an electronic component that temporarily stores programs and data to run, and it is ROM and RAM, for example. The auxiliary storage unit 103 is an electronic component that permanently stores data to be processed or having been processed, and it is a storage device such as a hard disk or a flash memory, for example. The communication control unit 104 is an electronic component that transmits and receives data to and from another device by wired or wireless means, and it is a network card or a wireless communication module, for example. The input device 105 is a device that receives input from a user, and it is a keyboard and a mouse, for example. The output device 106 is a device that outputs data specified or processed by the processor 101 in a form recognizable by a person, and it is a monitor and a speaker, for example.

The document classification device 10 may be composed of a single computer or a plurality of computers. In the case of using a plurality of computers, those computers are connected through a communication network such as the Internet or an intranet, and thereby one document classification device 10 is logically constructed.

Figure 2:
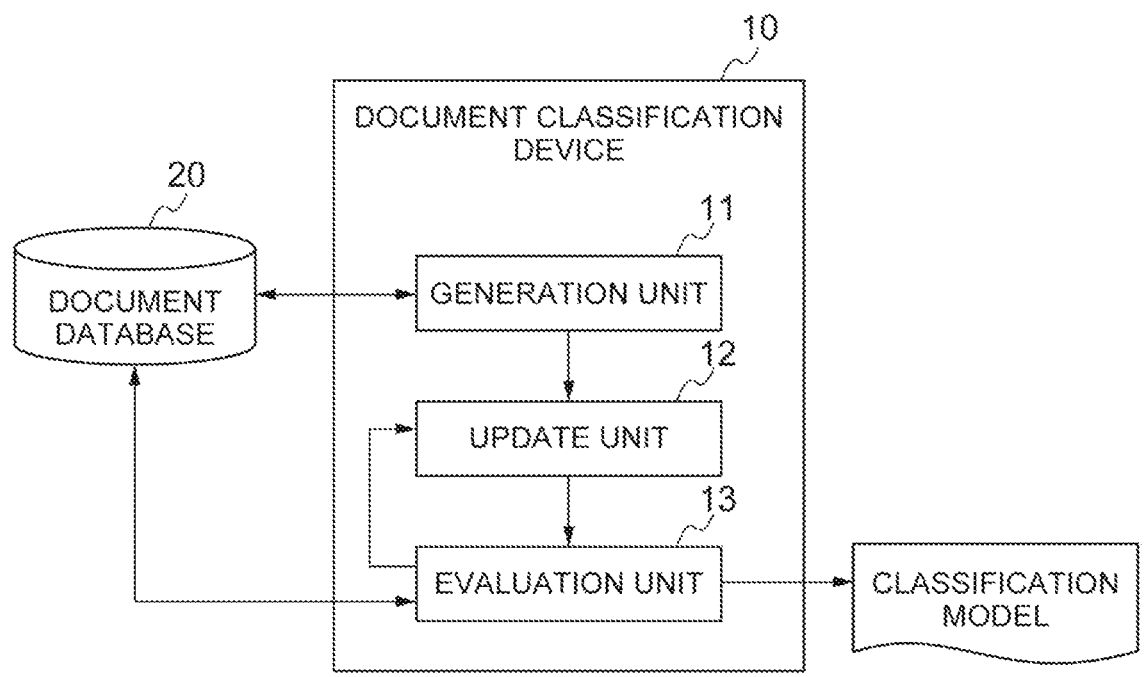
FIG. 2 is a view showing the functional configuration of a document classification device according to an embodiment.

FIG. 2 shows the functional configuration of the document classification device 10. The document classification device 10 includes, as functional elements, a generation unit 11, an update unit 12, and an evaluation unit 13. The generation unit 11 and the update unit 12 correspond to a classifier. Those functional elements are implemented by loading given software (a document classification program P1, which is described later) onto the processor 101 or the main storage device 102 and running the software. The processor 101 makes the communication control device 104, the input device 105 or the output device 106 operate in accordance with the software, and reads and writes data to and from the main storage device 102 or the auxiliary storage device 103. Data or databases required for the processing are stored in the main storage device 102 or the auxiliary storage device 103.

The generation unit 11 is a functional element that generates a classification model by performing machine learning (first machine learning) using, as input data (training data), a target document to which a correct path is given. The generation unit 11 reads a document to which a correct path is given from the document database 20. The generation unit 11 then performs machine learning by using a document with a correct path as input data, and thereby generates a classification model indicating a right path to a leaf node (correct leaf node) for the document. The generation unit 11 performs this processing on a plurality of target documents (e.g., a large number of target documents) to each of which a correct path is given, and thereby a classification model indicating a right path for each of the plurality of target documents is generated. The processing in the generation unit 11 is "supervised learning". The generation unit 11 outputs the generated classification model as "initial classification model", together with a set of processed target documents, to the update unit 12.

The update unit 12 is a functional element that updates a classification model by performing machine learning (second machine learning) that applies, to the initial classification model, a target document to which a correct path is not given. The update unit 12 uses the target document that is input from the generation unit 11, which is the target document used for generation of the initial classification model.

First, the update unit 12 performs machine learning using, as input data (training data), a target document to which a correct path is not given. This means performing machine learning without referring to a correct path. On the other hand, each time a path from the Nth level to the (N+1)th level is obtained by machine learning, the update unit 12 refers to a correct path and determines whether or not the path obtained from machine learning is different from the correct path. Note that N is a natural number. When both paths are different, that is, when a result of machine learning is an error, the update unit 12 sets a modified path for modifying the error based on the correct path. The modified path is a path from an incorrect node in the (N+1)th level to a correct node in the (N+2)th level (this correct node is included in the correct path). Based on the modified path, the update unit 12 learns a path that proceeds from the (N+1)th level to the (N+2)th level. As a result of this learning, the path may return to the correct path, or may proceed to a child node of an incorrect node in the (N+1)th level.

The update unit 12 performs this processing on a plurality of target documents to each of which a correct path is not given. Assume that, in processing of a certain target document, a path from an Nth level node to an (N+1)th level node is different from a correct path. In this case, there is a possibility that the update unit 12 updates a classification model by setting a path from the (N+1)th level node (incorrect node) to an (N+2)th level node (included in the correct path), which is not a child node of the (N+1)th level node, based on the correct path of the target document. By such imitation learning, a path is generated that modifies a path that has proceeded in a wrong direction back to a correct path.

There is a possibility that, while processing a plurality of target documents, the update unit 12 performs subsequent processing by following an existing modified path again. In this case, the update unit 12 can reuse the modified path without generating a new modified path.

On the other hand, when the path obtained from machine learning matches the correct path, that is, when a result of machine learning is correct, the update unit 12 performs subsequent processing without setting a modified path.

The update unit 12 outputs the classification model obtained by performing the above processing on a plurality of target documents as "updated classification model" to the evaluation unit 13.

There is a possibility that the update unit 12 may perform processing that has been performed on the initial classification model (i.e., second machine learning) on the updated classification model in response to an instruction from the evaluation unit 13. Thus, there is a possibility that, by this rerunning, a modified path is further set for the updated classification model.

The evaluation unit 13 is a functional element that evaluates an updated classification model. The evaluation of a classification model is processing that determines whether or not the classification model can classify a document into a right category at a certain level or higher.

The evaluation unit 13 reads data for evaluation (a set of documents for evaluation) from the document database 20, applies the data to the updated classification model and thereby associates a category with each of the documents. Then, the evaluation unit 13 evaluates the processing result by a specified evaluation method, and determines whether or not an evaluation value meets predetermined criteria. Note that the evaluation method is not particularly limited. For example, Micro F1, which is generally used in hierarchical document classification, may be used, or ARL (Averate Revenue Loss) may be used in addition to Micro F1. The criteria which an evaluation value should meet are also not particularly limited. For example, the evaluation unit 13 may determine that an evaluation value meets criteria when the evaluation value is equal to or more than a specified threshold. Alternatively, the evaluation unit 13 may determine that an evaluation value meets criteria when the degree of convergence of the evaluation value is within a specified range (when a different from a previous evaluation value is equal to or less than a specified threshold).

When an evaluation value meets the criteria, the evaluation unit 13 outputs the updated classification model as a final result. Where to output the classification model is not particularly limited. For example, the evaluation unit 13 may transmit the classification model to another device, may output the classification model from the output device 106 (e.g., a monitor or a printer) to visualize it, or may store the classification model into a specified database. The output classification model can be used for classifying any document.

On the other hand, when an evaluation value does not meet the criteria, the evaluation unit 13 instructs the update unit 12 to perform processing again. In response to this instruction, the update unit 12 performs the second machine learning on the updated classification model as described above.

The criteria to be used by the evaluation unit 13 may be set in accordance with an attribute of an object described in a document. The type of object is not particularly limited, and it may be a given tangible or non-tangible object, or event. The object is at least a part of the content of a document. The attribute of the object may be the one described or not described in the document. For example, when the object is a product sold on an online shopping site, the attribute of the object can be the price of the product, the number of sales of the object, the amount of sales of the object or the like.

The functions of the generation unit 11, the update unit 12 and the evaluation unit 13 described above can be represented by the following algorithm:

1: Initialize: D<-{ }
2: for k=1, 2, . . . , K do
3: $\pi n_k <- \beta_k \pi^* + (1-\beta_k)\hat{\pi}_k$
4: Sample T-step trajectories using $\pi_k$
5: Get dataset $D_k=(\varphi(s_{\pi k}),\pi^*(s_{\pi k}))$
6: Aggregate datasets: D<-D∪$D_k$
7: Train classifier $\hat{\pi}_{k+1}$ on D
8: end for
9: Return best $\hat{\pi}_k$ on validation The first line indicates initializing a data set D representing a classification model by substituting an empty set into the data set D.

The second to eighth lines indicate loop processing, which corresponds to generation of a classification model and one or more times of update. The third line indicates setting of a mixed policy $\pi_k$ to be used in the k-th processing. $\pi^*$ indicates a policy called "Oracle" that returns a right path (ideal path). $\hat{\pi}_k$ indicates the current policy (policy trained by processing in the seventh line described later). $\beta_k$ indicates a mixing ratio between Oracle and the current policy (in other words, a contribution ratio of Oracle). This mixing ratio is a sequence that satisfies:

$$\frac{1}{N}\sum_k \beta_k \to 0 \quad (1)$$

when N->∞. The mixing ratio may be $\beta_1=1$ and $\beta_k=0(k>1)$, which means using only Oracle for the first time and using only the current policy, without using Oracle, for the second and subsequent times. Alternatively, $\beta_1=1$ and $\beta_k$ may be set to a numerical value larger than 0 and smaller than 1 when k>1 (note that, however, the above expression (1) needs to be satisfied).

The fourth line indicates sampling a path on the category tree by machine learning using the mixed policy $\pi_k$. The fifth line indicates acquisition of a data set $D_k$, which is a set of paths newly obtained by the machine learning. The sixth line indicates adding the data set $D_k$ to the data set D and thereby updating the data set D (classification model). The seventh line indicates learning a policy $\hat{\pi}_{k+1}$ by using the updated data set D.

The initial loop processing corresponds to the generation unit 11. The generation unit 11 obtains a set of right paths (data set $D_1$) in accordance with Oracle $\pi^*$, and uses the obtained set as the data set D (classification model). The generation unit 11 then obtains a policy $\hat{\pi}_2$ corresponding to this data set D.

The second and subsequent loop processing corresponds to the update unit 12. In the second loop processing, the update unit 12 uses a mixed policy $\pi_2$ that is calculated using a specified mixing ratio $\beta_2$. Because the current policy is taken into consideration in this mixed policy, there is a possibility that the mixed policy takes a different action from Oracle, and accordingly, there is a possibility that a modified path is generated. The update unit 12 obtains a set of modified paths (data set $D_2$) and adds this set to the data set D indicating a set of right paths. Then, the update unit 12 obtains a policy $\hat{\pi}_3$ corresponding to the updated data set D (classification model). The third and subsequent processing is the same as the second processing.

The ninth line corresponds to the evaluation unit 13 that outputs a classification model employed by evaluation.

Figure 3:
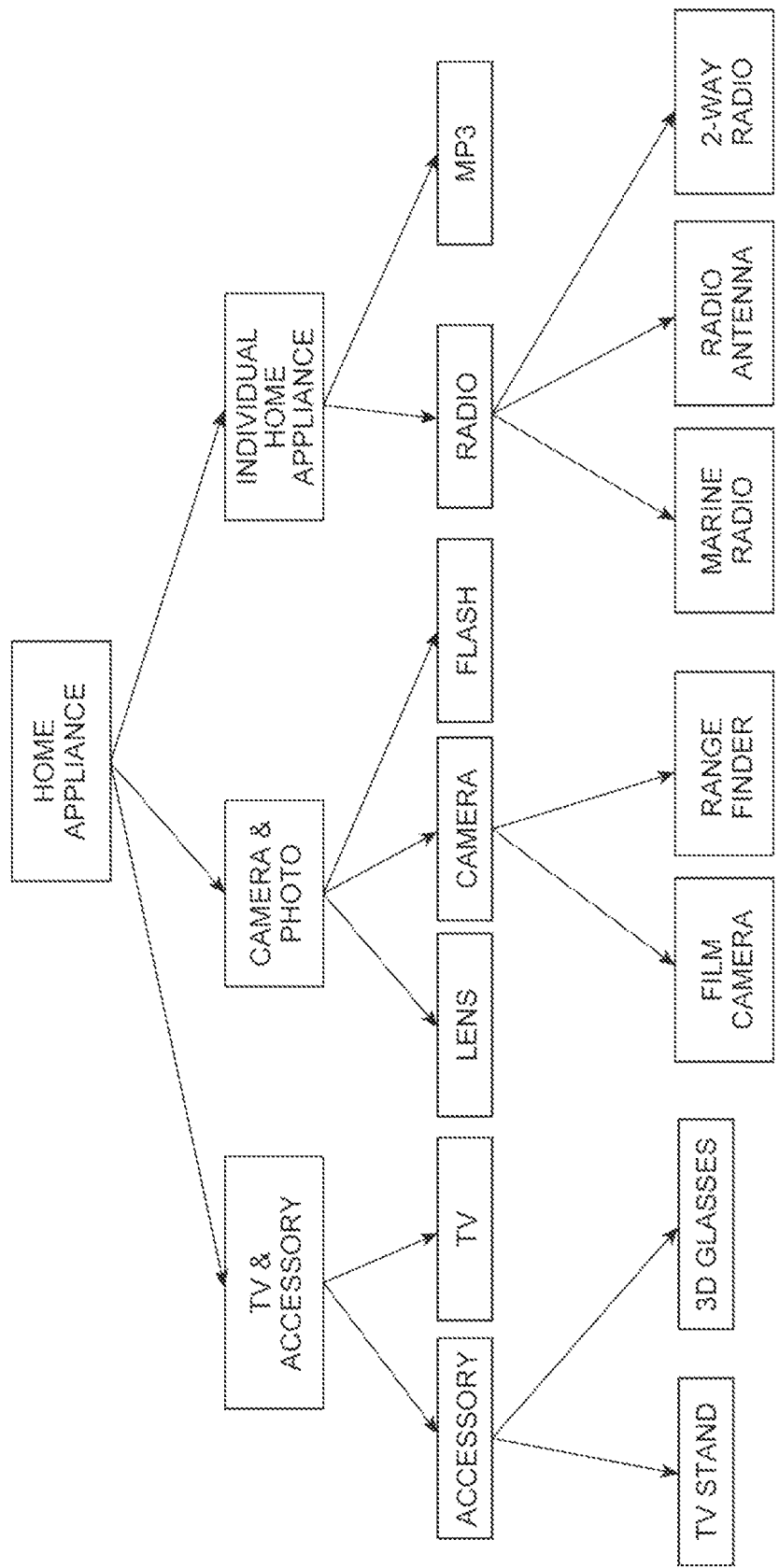
FIG. 3 is a view showing an example of a category tree.

The document classification device 10 and the above algorithm are further described with reference to FIGS. 3 to 6. FIG. 3 shows a category tree regarding home appliances. In this example, "home appliance" is the first level node (root node), and there are three nodes in the second level. Each second level node has child nodes (third level nodes). Further, some of the third level nodes have child nodes (fourth level nodes). All of the fourth level nodes and the third level nodes not having a child node are leaf nodes. An example of processing regarding the leaf node "film camera" in the fourth level is described hereinbelow.

Figure 4:
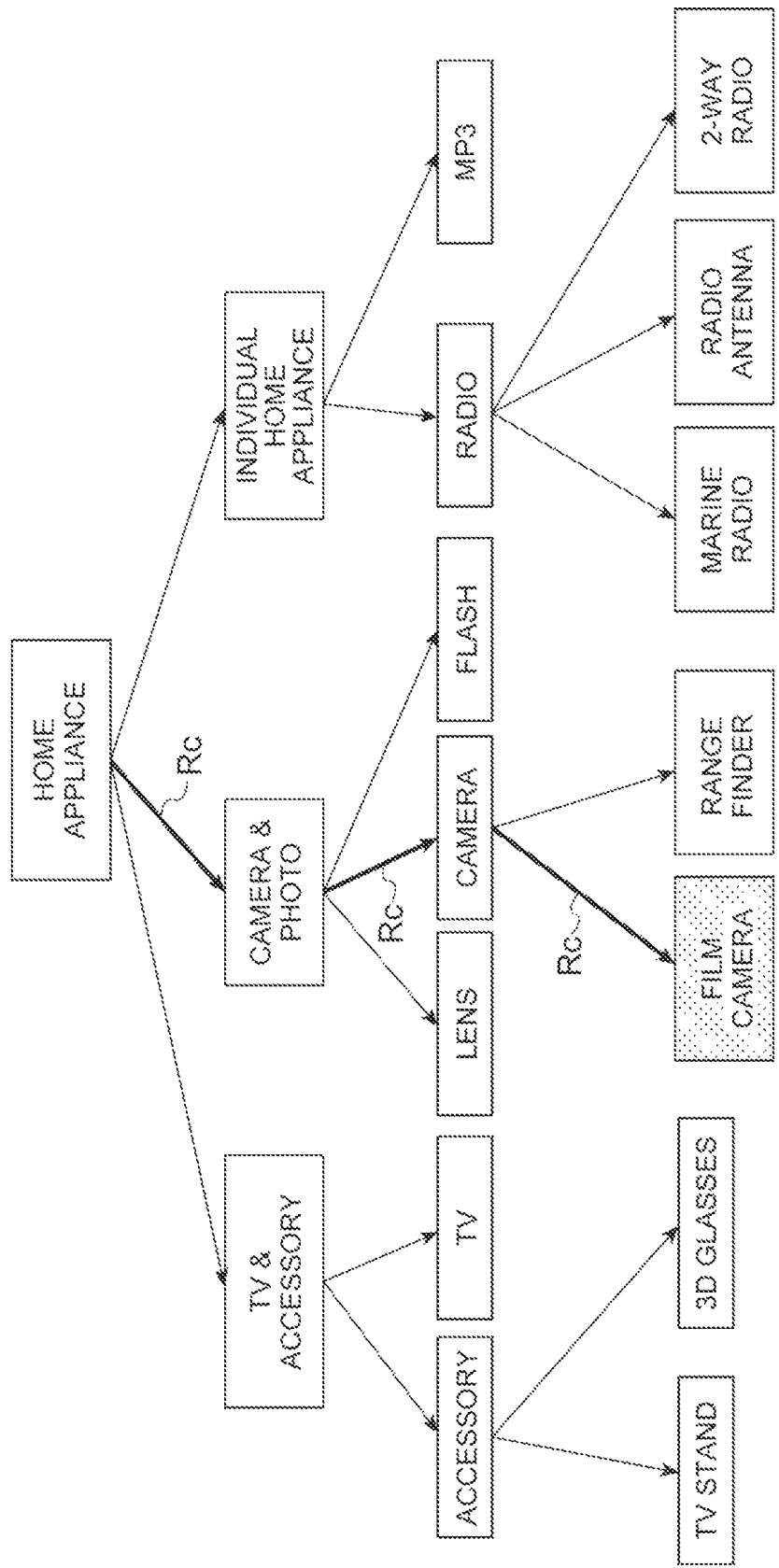
FIG. 4 is a view showing an example of generation of a classification model.

FIG. 4 shows that the generation unit 11, which corresponds to the initial loop processing, obtains a correct path Rc ["home appliance"→"camera & photo"→ "camera"→"film camera"]. This correct path Rc follows the link of a given category tree.

Figure 5:
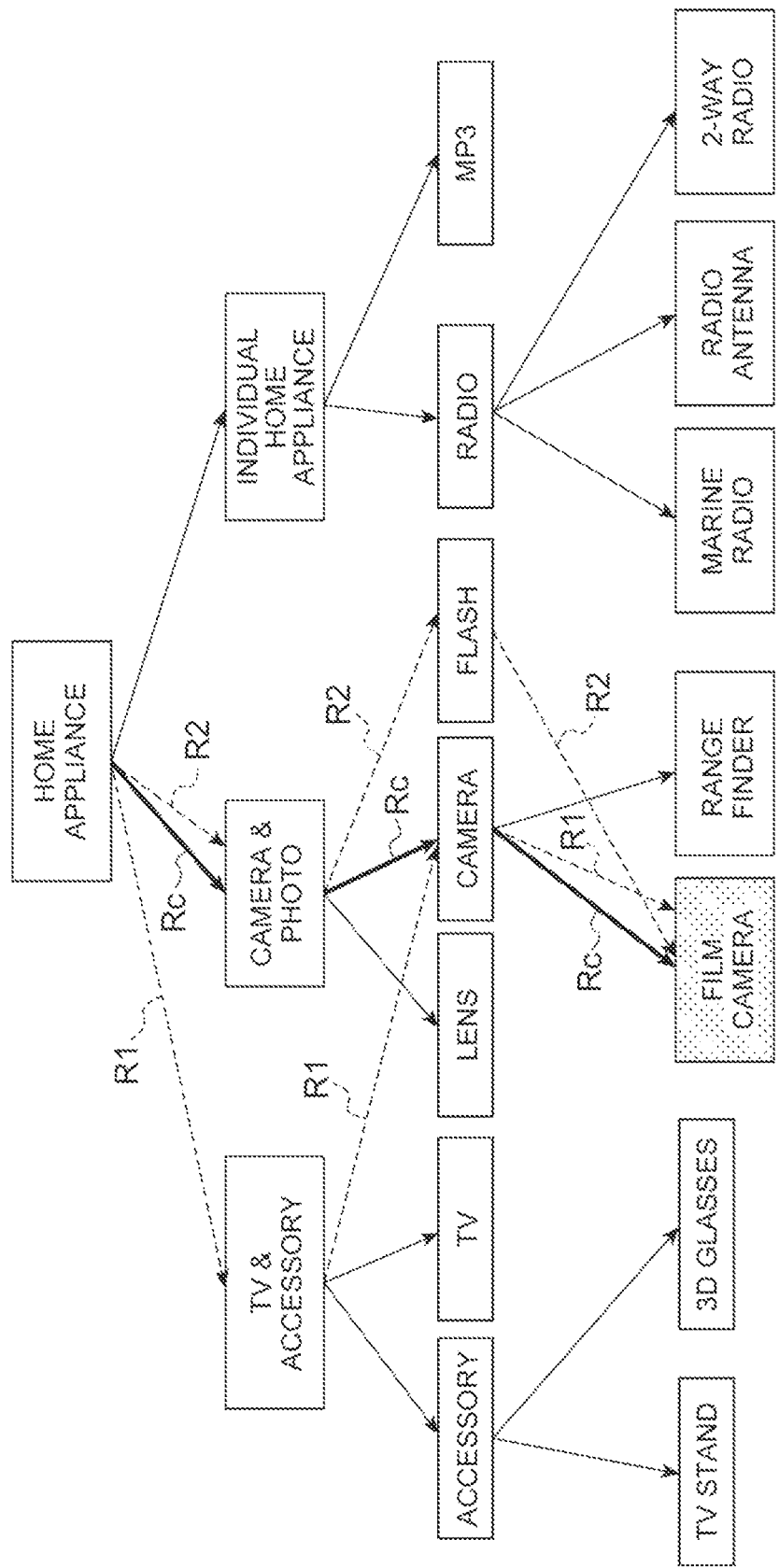
FIG. 5 is a view showing an example of update of a classification model.

FIG. 5 shows that the update unit 12, which corresponds to the second loop processing, obtains two paths R1 and R2.
R1: ["home appliance"→"TV & accessory"→ "camera"→"film camera"]
R2: ["home appliance"→"camera & photo"→ "flash"→"film camera"]

As for the path R1, a path from the first level node "home appliance" to the second level node "TV & accessory" is different from the correct path Rc. However, a modified path from the second level node "TV & accessory" to the third level node "camera", which is not a child node of the second level node "TV & accessory", can be generated by processing of the update unit 12. In this case, the path R1 can return to the correct path Rc and then reach the leaf node "film camera".

The same thing as the path R1 applies to the path R2. Specifically, a path from the second level node "camera & photo" to the third level node "flash" is different from the correct path Rc. However, a modified path from the third level node "flash" to the fourth level node "film camera", which is not a child node of the third level node "flash", can be generated by processing of the update unit 12. In this case, the path R2 can eventually reach the leaf node "film camera", which is the end point of the correct path Rc.

Figure 6:
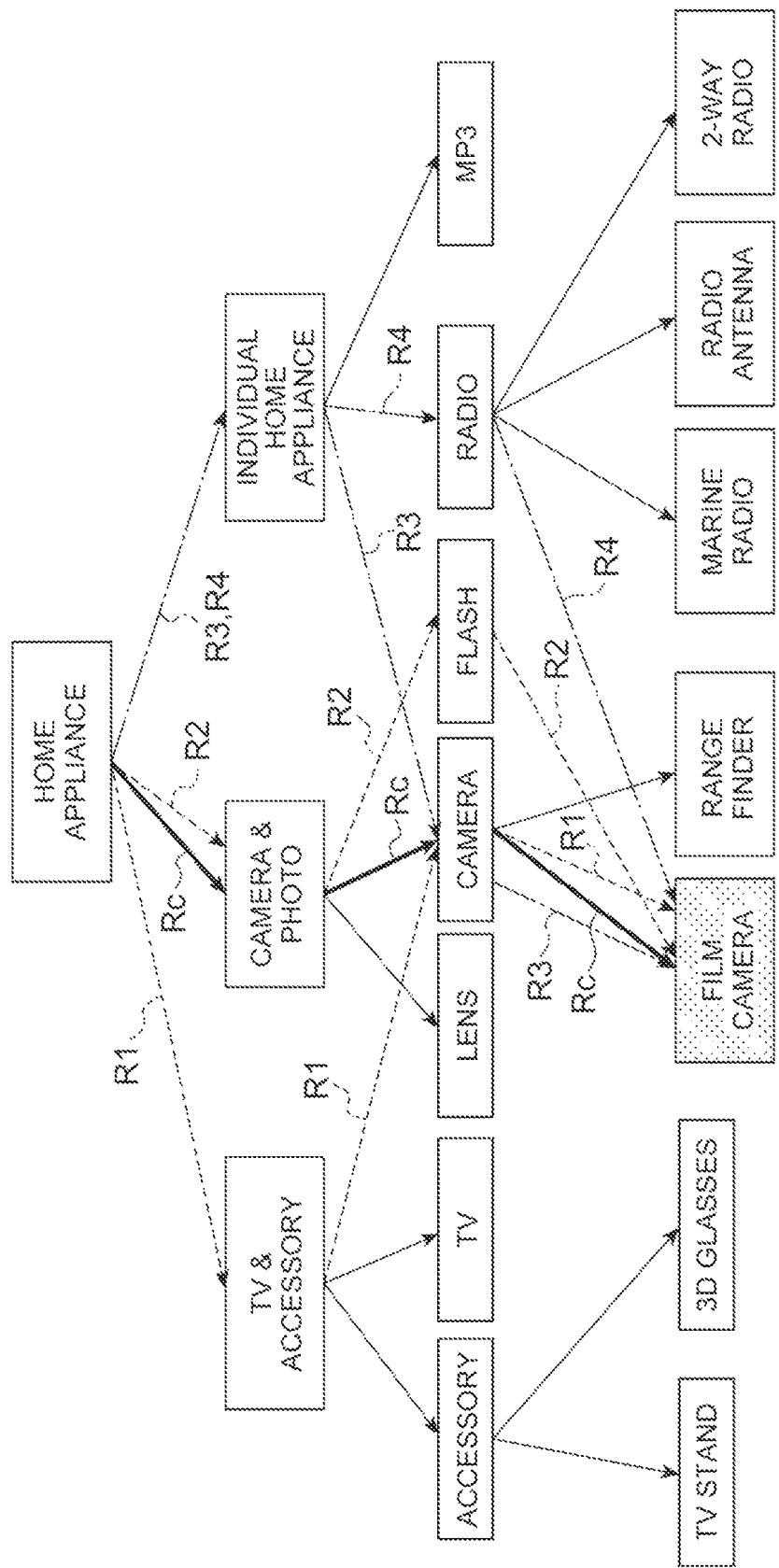
FIG. 6 is a view showing an example of update of a classification model.

FIG. 6 shows that the following two paths R3 and R4 are obtained by rerunning of the update unit 12 based on an instruction from the evaluation unit 13.
R3: ["home appliance"→"individual home appliance"→"camera"→"film camera"]
R4: ["home appliance"→"individual home appliance"→"radio"→"film camera"]

As for the path R3, a path from the first level node "home appliance" to the second level node "individual home appliance" is different from the correct path Rc. However, a modified path from the second level node "individual home appliance" to the third level node "camera", which is not a child node of the second level node "individual home appliance", can be generated by processing of the update unit 12. In this case, the path R3 can return to the correct path Rc and then reach the leaf node "film camera".

Like the path R4, an incorrect path that goes from the first level node "home appliance" through the second level node "individual home appliance" to the third level node "radio" may be obtained. However, there is a possibility that a modified path from the third level node "radio" to the fourth level node "film camera", which is not a child node of the third level node "radio", can be generated by processing of the update unit 12. In this case, the path R4 can eventually reach the leaf node "film camera", which is the end point of the correct path Rc.

As shown in FIGS. 5 and 6, the modified path does not follow the link of a given category tree. As a result of paths assuming errors in learning, such as the paths R1 to R4 in FIG. 6, being added to the classification model, it is possible to reduce errors in prediction and increase the accuracy of document classification.

Figure 7:
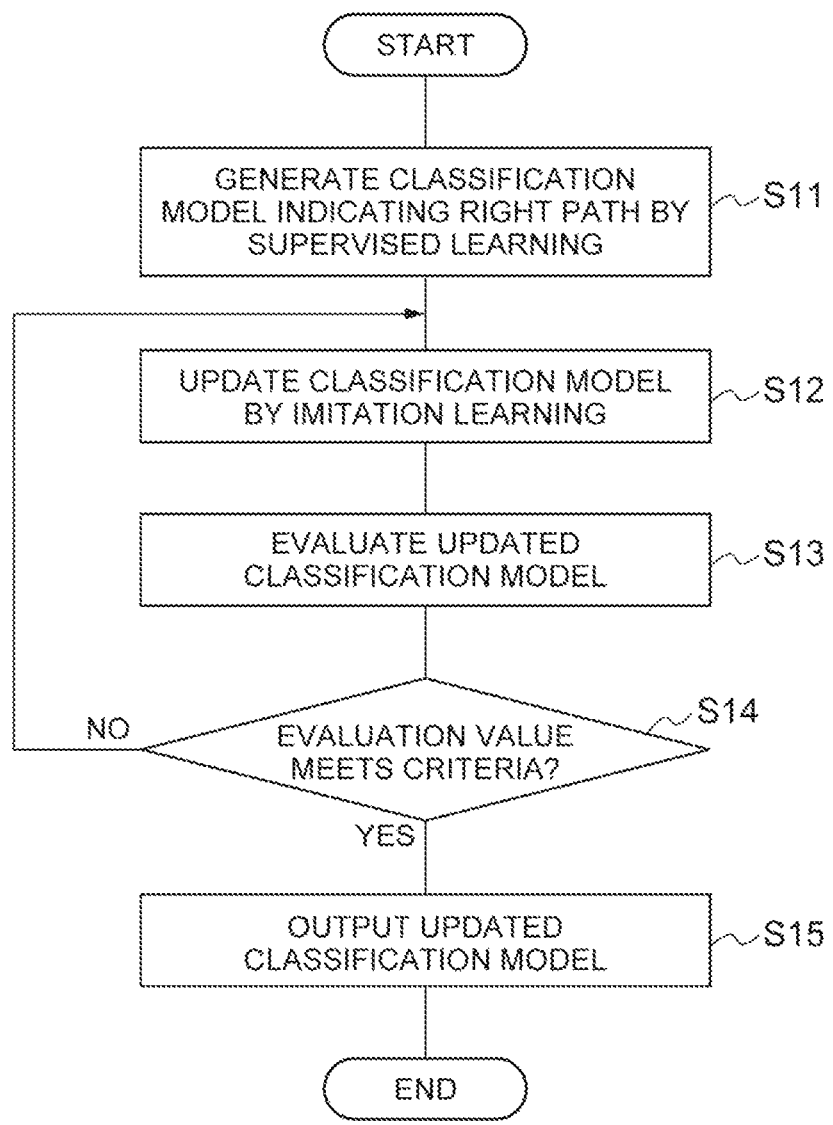
FIG. 7 is a flowchart showing the operation of a document classification device according to an embodiment.

Hereinafter, the operation of the document classification device 10 and a document classification method according to this embodiment are described with reference to FIG. 7. First, the generation unit 11 generates a classification model indicating a right path by so-called supervised learning (i.e. by using Oracle) (Step S11). Next, the update unit 12 updates the classification model by imitation learning represented by the above-described algorithm (Step S12). Then, the evaluation unit 13 evaluates the updated classification model (Step S13). When the evaluation value meets criteria (Yes in Step S14), the evaluation unit 13 outputs the classification model (Step S15). On the other hand, when the evaluation value does not meet criteria (No in Step S14), the process returns to Step S12 for further update of the classification model.

Figure 8:
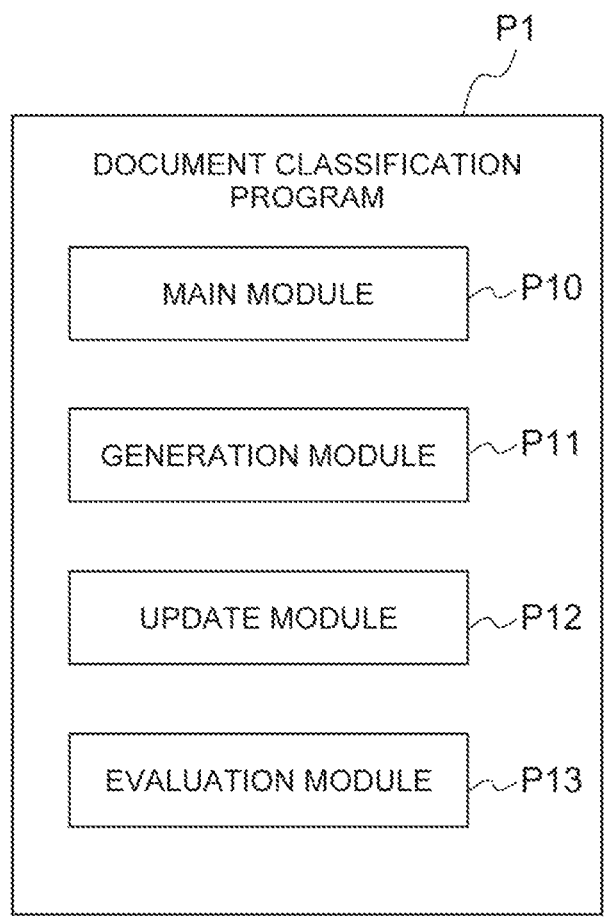
FIG. 8 is a view showing the configuration of a document classification program according to an embodiment.

A document classification program P1 for implementing the document classification device 10 is described hereinafter with reference to FIG. 8. The document classification program P1 includes a main module P10, a generation module P11, an update module P12 and an evaluation module P13. The main module P10 is a part that exercises control over the generation of a classification model. The functions implemented by executing the generation module P11, the update module P12 and the evaluation module P13 are equal to the functions of the generation unit 11, the update unit 12 and the evaluation unit 13 described above, respectively.

The document classification program P1 is provided in the form of being recorded in a static manner on a tangible recording medium such as CD-ROM, DVD-ROM or semiconductor memory. Alternatively, the document classification program P1 may be provided as a data signal superimposed onto a carrier wave through a communication network.

As described above, a document classification device according to one aspect of the present invention includes a generation unit configured to perform first machine learning on a target document, as input data, to which a correct path in a tree structure is given, each node in the tree structure indicating a document category, and thereby generate a classification model indicating a right path to a leaf node for the target document, and an update unit configured to perform second machine learning that applies, to the classification model, the target document to which the correct path is not given, and when a path from an Nth level node to an (N+1)th level node is different from the correct path, update the classification model by setting a modified path from the (N+1)th level node to an (N+2)th level node different from a child node of the (N+1)th level node based on the correct path.

A document classification method according to one aspect of the present invention is a document classification method performed by a document classification device including a processor, the method including a generation step of performing first machine learning on a target document, as input data, to which a correct path in a tree structure is given, each node in the tree structure indicating a document category, and thereby generating a classification model indicating a right path to a leaf node for the target document, and an update step of performing second machine learning that applies, to the classification model, the target document to which the correct path is not given, and when a path from an Nth level node to an (N+1)th level node is different from the correct path, updating the classification model by setting a modified path from the (N+1)th level node to an (N+2)th level node different from a child node of the (N+1)th level node based on the correct path.

A document classification program according to one aspect of the present invention causes a computer to execute a generation step of performing first machine learning on a target document, as input data, to which a correct path in a tree structure is given, each node in the tree structure indicating a document category, and thereby generating a classification model indicating a right path to a leaf node for the target document, and an update step of performing second machine learning that applies, to the classification model, the target document to which the correct path is not given, and when a path from an Nth level node to an (N+1)th level node is different from the correct path, updating the classification model by setting a modified path from the (N+1)th level node to an (N+2)th level node different from a child node of the (N+1)th level node based on the correct path.

In such aspects, a classification model is generated by machine learning using a target document to which a correct answer is given (so-called supervised learning). Then, when a path is different from the correct path in machine learning where a target document is applied to a classification model without giving a correct answer, a modified path to a different subtree is generated based on the correct path, rather than proceeding to a lower level node. With the modified path, it is possible to return in a direction of coming closer to a correct answer even when the classification processing has proceeded in a wrong direction. By using the classification model processed in this manner, it is possible to increase the accuracy of classifying a document using a tree structure. For example, it is possible to guide the classification processing that has proceeded in a wrong direction eventually to a right leaf node (leaf category). Even if it is not possible to guide it to a right leaf node, it is possible to guide the classification processing to a different leaf node that is highly related or similar to this leaf node (leaf node which is a brother etc. of the right leaf node).

In the document classification device according to another aspect, the update unit may set the modified path from the (N+1)th level node to the (N+2)th level node included in the correct path. By allowing a path that has once gone in a wrong direction to return to a correct path, it is possible to increase the accuracy of document classification.

In the document classification device according to another aspect, the update unit may perform the second machine learning without using a policy of returning the right path. By performing machine learning without giving a clue to a correct path, the probability of obtaining an erroneous path increases. This however raises chances to set a modified path for all possible errors, and it is thereby possible to increase the accuracy of document classification.

In the document classification device according to another aspect, the update unit may perform the second machine learning by using a mixture of a policy of returning the right path and a trained policy. Because a mixed policy contains a clue to a correct path, there is a possibility that path errors in the second machine learning decreases. As a result, the number of times of setting a modified path decreases, which can lead to reduction of the overall time required for generation of the classification model.

The document classification device according to another aspect may further include an evaluation unit configured to classify a document by using a classification model updated by the update unit and evaluate the classification model. It is thereby possible to evaluate the classification model.

In the document classification device according to another aspect, when an evaluation value indicating evaluation by the evaluation unit does not meet predetermined criteria, the update unit may perform the second machine learning that applies, to the updated classification model, the target document to which the correct path is not given, and thereby rerun update of the classification model. In this case, it is possible to provide the classification model that meets a certain criteria.

In the document classification device according to another aspect, the predetermined criteria may be set in accordance with an attribute of an object described in the document. In this case, it is possible to set the strictness of evaluation of the classification model in accordance with the content of the document.

An embodiment of the present invention is described in detail above. However, the present invention is not limited to the above-described embodiment. Various changes and modifications may be made to the present invention without departing from the scope of the invention.

In the above-described embodiment, when a path from an Nth level node to an (N+1)th level node is different from a correct path, the update unit 12 sets a modified path from the (N+1)th level node to an (N+2)th level node included in the correct path. However, the end point of a modified path is not necessarily a node included in a correct path. For example, the update unit 12 may set a modified path to an (N+2)th level node included in a subtree that is located between a subtree having an incorrect (N+1)th level node as the root node and a subtree including a correct path. In this case, even when a document is not classified into a right category, the probability increases that the document is classified into a category which is a brother etc. of the right category (category that is highly related or similar to the right category).

The evaluation unit may be omitted. The update unit may repeat the update of a classification model a specified number of times without any conditions and then output the final classification model. Alternatively, the update unit may perform the update of a classification model only once and then output the classification model.

The document classification device may include a classification unit that classifies any document by using a classification model obtained finally. The classification unit is a practical stage of a classification model.

The procedure of the document classification method that is performed by at least one processor is not limited to the example shown in the above embodiment. For example, the document classification device may skip some of the above-described steps (processing), or may perform the steps in a different order. Further, any two or more steps of the above-described steps may be combined, or some of the steps may be modified or eliminated. Alternatively, the document classification device may perform another step in addition to the above-described steps.

When comparing two numerical values in the document classification device, any of the two criteria "equal to or more than" and "more than" may be used, and any of the two criteria "equal to or less than" and "less than" may be used. Selection of the criteria would not change the technical significance regarding the processing of comparing two numerical values.

REFERENCE SIGNS LIST

10 . . . document classification device, 11 . . . generation unit, 12 . . . update unit, 13 . . . evaluation unit, P1 . . . document classification program, P10 . . . main module, P11 . . . generation module, P12 . . . update module, P13 . . . evaluation module

The invention claimed is:

1. A computer system comprising:
   at least one memory configured to store computer program code;
   at least one processor configured to access the computer program code and operate as instructed by the computer program code, the computer program code including:
   generation code configured to cause at least one of the at least one processor to perform first machine learning on a target document, as input data, to which a correct path in a tree structure is given, each node in the tree structure indicating a document category, and thereby generate a classification model indicating a right path from a root node to a leaf node in the tree structure to be associated with for the target document, wherein nodes included in the right path includes an Nth level node, an (N+1)th level node, and an (N+2)th level node, N being an integer equal to or greater than 1;
   update code configured to cause at least one of the at least one processor to:
     perform second machine learning that applies, to the classification model, the target document, without referring to the correct path;
     each time a path from the Nth level node to the (N+1)th level node is obtained by the second machine learning, determine whether the obtained path is different from the correct path by referring to the correct path of the target document; and
     based on determining that the path from the Nth level node to the (N+1)th level node is different from the correct path, update the classification model by setting a modified path from the (N+1)th level node to an (N+2)th level node different from a child node of the (N+1)th level node, the (N+2)th level node being determined based on the correct path.

2. The computer system according to claim 1, wherein the update code is further configured to cause at least one of the at least one processor to set the modified path from the (N+1)th level node to the (N+2)th level node included in the correct path.

3. The computer system according to claim 1, wherein the update code is further configured to cause at least one of the at least one processor to perform the second machine learning without using a policy of returning the right path.

4. The computer system according to claim 1, wherein the update code is further configured to cause at least one of the at least one processor to perform the second machine learning by using a mixture of a policy of returning the right path and a trained policy.

5. The computer system claim 1, further comprising:
   evaluation code configured to cause at least one of the at least one processor to classify a document by using the updated classification model and evaluate the update classification model.

6. The computer system according to claim 1, wherein when an evaluation value indicating evaluation by the at least one processor does not meet predetermined criteria, the update code causes the at least one processor to perform the second machine learning that applies, to the updated classification model, the target document, and thereby rerun update of the classification model.

7. The computer system according to claim 6, wherein the predetermined criteria are set in accordance with an attribute of an object described in the document.

8. A method performed by a computer system including a processor, the method comprising:
- performing first machine learning on a target document, as input data, to which a correct path in a tree structure is given, each node in the tree structure indicating a document category, and thereby generating a classification model indicating a right path from a root node to a leaf node in the tree structure to be associated with for the target document, wherein nodes included in the right path includes an Nth level node, an (N+1)th level node, and an (N+2)th level node, N being an integer equal to or greater than 1;
- performing second machine learning that applies, to the classification model, the target document, without referring to the correct path;
- each time a path from the Nth level node to the (N+1)th level node is obtained by the second machine learning, determining whether the obtained path is different from the correct path by referring to the correct path of the target document and based on determining that the path from the Nth level node to the (N+1)th level node is different from the correct path, updating the classification model by setting a modified path from the (N+1)th level node to an (N+2)th level node different from a child node of the (N+1)th level node, the (N+2)th level node being determined based on the correct path.

9. A non-transitory computer readable recording medium storing a program configured to case a computer to:
- perform first machine learning on a target document, as input data, to which a correct path in a tree structure is given, each node in the tree structure indicating a document category, and thereby generating a classification model indicating a right path from a root node to a leaf node in the tree structure to be associated with for the target document, wherein nodes included in the right path includes an Nth level node, an (N+1)th level node, and an (N+2)th level node, N being an integer equal to or greater than 1;
- perform second machine learning that applies, to the classification model, the target document, without referring to the correct path;
- each time a path from the Nth level node to the (N+1)th level node is obtained by the second machine learning, determine whether the obtained path is different from the correct path by referring to the correct path of the target document; and
- based on determining that the path from the Nth level node to the (N+1)th level node is different from the correct path, updating the classification model by setting a modified path from the (N+1)th level node to an (N+2)th level node different from a child node of the (N+1)th level node, the (N+2)th level node being determined based on the correct path.

10. The computer system of claim 5, further comprising:
- wherein the evaluation code updates the classification model using an evaluation method selecting from the group consisting of Micro F1, Averate Revenue Loss, hitting a specified threshold, and meeting a specified degree of convergence.

* * * * *